(12) United States Patent
Shih et al.

(10) Patent No.: US 9,329,733 B2
(45) Date of Patent: *May 3, 2016

(54) METHOD FOR DETECTING TOUCH SPOT OF TOUCH PANEL

(71) Applicant: TAINJIN FUNAYUANCHUANG TECHNOLOGY CO.,LTD., Tianjin (CN)

(72) Inventors: Po-Sheng Shih, Hsinchu (TW); Chien-Yung Cheng, Hsinchu (TW)

(73) Assignee: TIANJIN FUNAYUANCHUANG TECHNOLOGY CO., LTD., Tianjin (CN)

( * ) Notice: Subject to any disclaimer, the term of this patent is extended or adjusted under 35 U.S.C. 154(b) by 343 days.

This patent is subject to a terminal disclaimer.

(21) Appl. No.: 13/905,369

(22) Filed: May 30, 2013

(65) Prior Publication Data

US 2014/0354581 A1 Dec. 4, 2014

(51) Int. Cl.
*G06F 3/044* (2006.01)
*G06F 3/041* (2006.01)
*G06F 3/045* (2006.01)

(52) U.S. Cl.
CPC ............. *G06F 3/044* (2013.01); *G06F 3/041* (2013.01); *G06F 3/045* (2013.01); *G06F 3/0416* (2013.01)

(58) Field of Classification Search
CPC ..... G06F 3/044; G06F 3/0416; G06F 3/0412; G06F 3/0418; G06F 3/041; G06F 3/045
USPC .................................................. 345/173, 174
See application file for complete search history.

(56) References Cited

U.S. PATENT DOCUMENTS

| | | | | |
|---|---|---|---|---|
| 8,487,906 B2 * | 7/2013 | Chen | ........................ | G06F 3/045 345/173 |
| 8,624,873 B2 * | 1/2014 | Huang | ..................... | G06F 3/044 345/173 |
| 8,803,841 B2 * | 8/2014 | Shih | ........................ | G06F 3/044 345/174 |
| 2011/0216035 A1 * | 9/2011 | Shih | ......................... | G06F 3/045 345/174 |
| 2013/0057504 A1 * | 3/2013 | Huang | ..................... | G06F 3/044 345/174 |

* cited by examiner

*Primary Examiner* — Aneeta Yodichkas
*Assistant Examiner* — Saifeldin Elnafia
(74) *Attorney, Agent, or Firm* — Novak Druce Connolly Bove + Quigg LLP

(57) ABSTRACT

A method for detecting touch spots of a touch panel. In the detecting process, a pulse signal is input into each of a plurality of first driving-sensing electrodes, thereby simulating an $R_{1n}C$ curve for computing a coordinate of the touch spots, at a high impedance direction. The capacitance C is detected. A coordinate of the touch spot at a low impedance direction is obtained by calculating a ratio of the $R_{1n}C$ and the capacitance C to obtain the resistance $R_{1n}$.

19 Claims, 9 Drawing Sheets

METHOD FOR DETECTING TOUCH SPOT OF TOUCH PANEL

BACKGROUND

1. Technical Field

The present disclosure relates to methods for detecting touch spot of touch panel, particularly, to a method for detecting touch spot of surface capacitive touch panel.

2. Description of Related Art

Nowadays, capacitive touch panels having a high sensitivity are very popular. The capacitive touch panel commonly includes a transparent conductive layer and four electrodes respectively disposed on four corners of the transparent conductive layer. Voltage is applied on the transparent conductive layer by the four electrodes to form an equipotential plane. If a touch object (e.g. a bare finger or a conductive pen) touches the surface of the capacitive touch panel, a coupling capacity is formed between the touch object and the capacitive touch panel, and a current is generated between each electrode and the touch spot. The current value is proportional to a distance between each electrode and the touch spot. Thus, the location of the touch spot can be calculated according to a relation of the distance between each electrode and the touch spot and the corresponding current value.

However, an accuracy of detecting the location of the touch spot by the above method is low.

What is needed, therefore, is to provide a method for accurately detecting the touch spot of the capacitive touch panel.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
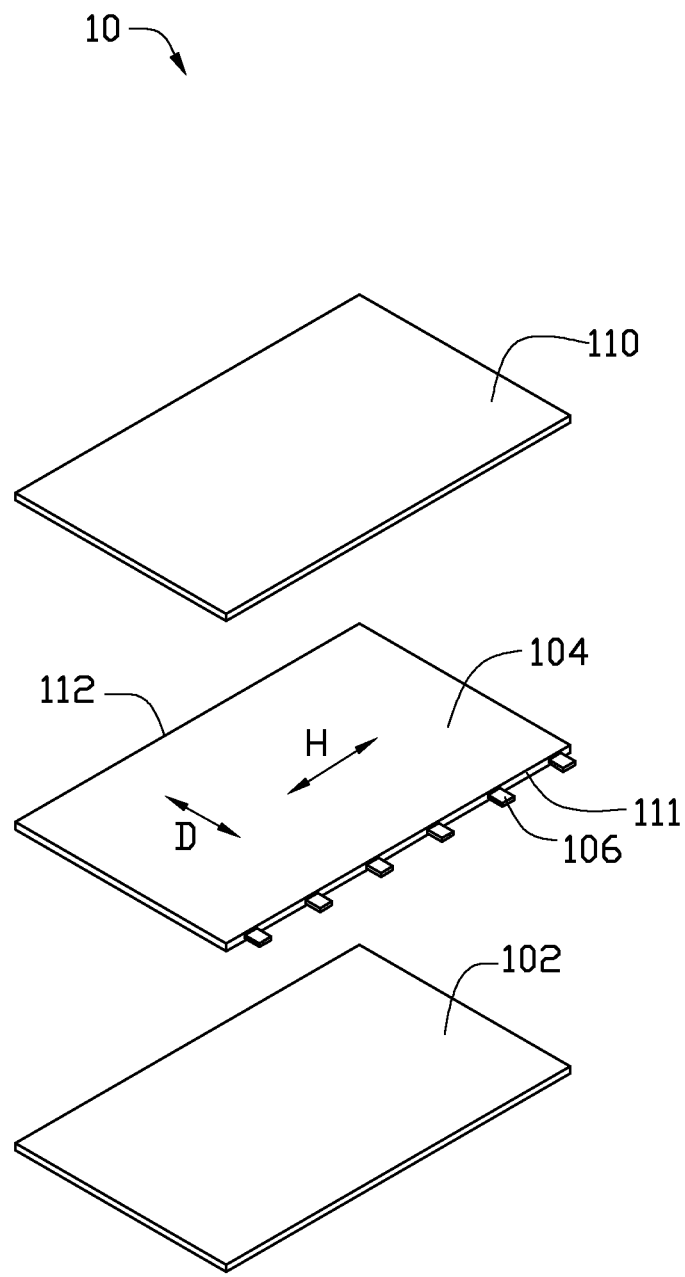
FIG. 1 shows a structural schematic view of one embodiment of a touch panel.
Figure 2:
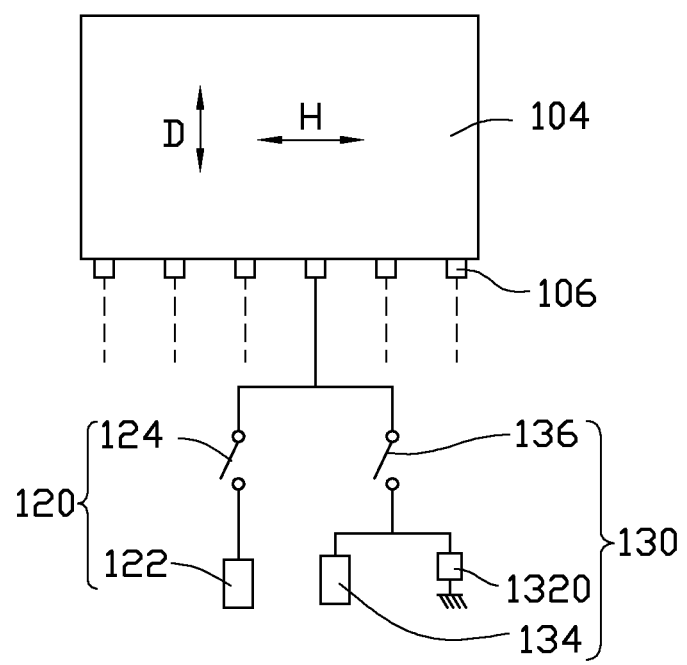
FIG. 2 shows a schematic view of one embodiment of a driving circuit and a sensing circuit electrically connected with each driving-sensing electrode of the touch panel.
Figure 3:
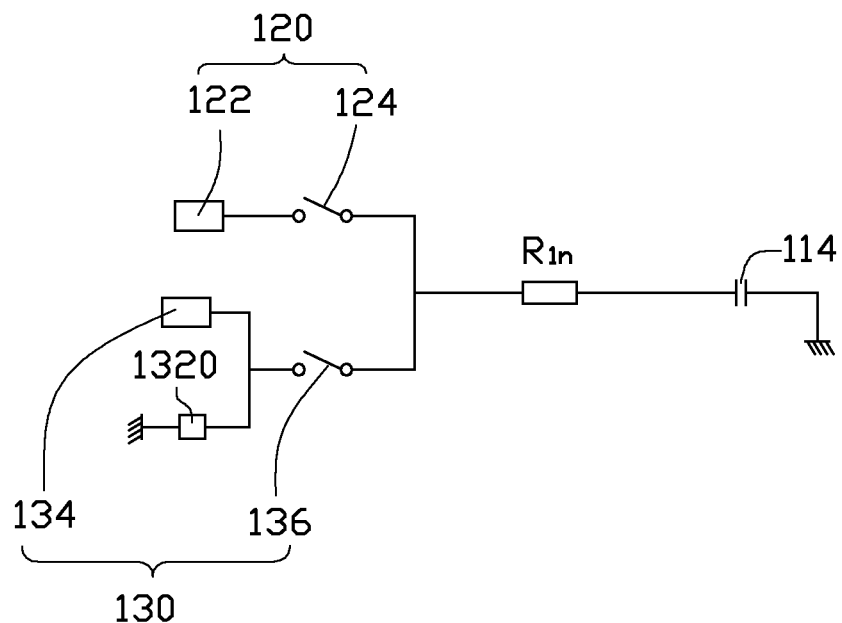
FIG. 3 shows a simplified circuit view when the touch panel is touched.

Referring to FIGS. 1 to 3, a touch panel 10 in one embodiment of a method for detecting touch spot includes: a substrate 102, a conductive film 104 disposed on the substrate 102, and a plurality of first driving-sensing electrodes 106. The conductive film 104 has anisotropy of impedance defining a low impedance direction D and a high impedance direction H therein. The low impedance direction D is substantially perpendicular to the high impedance direction H. The conductive film 104 has a first side 111 and a second side 112 extending along the high impedance direction H. The first side 111 is opposite to the second side 112. The plurality of first driving-sensing electrodes 106 are arranged along the first side 111 and spaced from each other. The plurality of first driving-sensing electrodes 106 are electrically connected with the conductive film 104. In addition, each first driving-sensing electrode 106 is electrically connected with a driving circuit 120 and a sensing circuit 130. When the touch panel 10 is touched by a conductive object at a touch spot, a coupling capacitance 114 having a capacitance value C between the conductive film 104 and the conductive object is formed. A resistance of the conductive film 104 between the touch spot and the first driving-sensing electrodes 106 can be represented by $R_{11}, R_{12}, \ldots R_{1n}$ (n=1, 2, 3 ...).

The method for detecting the touch spot includes:

S1, inputting a pulse signal into each first driving-sensing electrode 106 by the driving circuit 120, and reading $R_{1n}C$ detected by each sensing circuit 130, thereby simulating a first curve of the $R_{1n}C$ along the high impedance direction H to compute coordinate of the touch spot at the high impedance direction H; and S2, detecting the capacitance C of the coupling capacitance 114 by the sensing circuit 130; and S3, calculating a coordinate of the touch spot at the low impedance direction D by computing a ratio of the $R_{1n}C$ detected by the first driving-sensing electrodes 106 and the capacitance C to obtain the resistance $R_{1n}$ of the conductive film 104 between the touch spot and the first driving-sensing electrodes 106.

The structure of the touch panel 10 is specifically described as follows.

The substrate 102 can be made of a transparent material. The transparent material can be polythene, polycarbonate, polyethylene terephathalate, polymethyl Methacrylate, glass, quartz, or diamond.

The conductive film 104 is an anisotropic transparent conductive film. A conductivity of the conductive film 104 at the low impedance direction D is much larger than the conductivity of the conductive film 104 at other directions. A conductivity of the conductive film 104 at the high impedance direction H is smaller than the conductivity of the conductive film 104 at other directions. The low impedance direction D is substantially perpendicular to the high impedance direction H. In one embodiment, the conductive film 104 includes at least one carbon nanotube film drawn from a carbon nanotube array. A large number of the carbon nanotubes in the carbon nanotube film can be joined end by end along a preferred orientation. The carbon nanotube film can be a free-standing structure. The term "free-standing structure" can be defined as a structure that does not have to be supported by a substrate. For example, a free-standing structure can sustain the weight of itself when it is hoisted by a portion thereof without any significant damage to its structural integrity. So, if the carbon nanotube film is placed between two separate supporters, a portion of the carbon nanotube drawn film, not in contact with the two supporters, would be suspended between the two supporters and yet maintain film structural integrity. The free-standing structure of the carbon nanotube film is realized by the successive carbon nanotubes joined end to end by van der Waals attractive force. The carbon nanotubes have an excellent conductive along an axis of the carbon nanotubes. Thus, the carbon nanotube film has anisotropy of impedance. An extending direction of the carbon nanotubes is the low impedance direction D. A direction perpendicular to the extending direction of the carbon nanotubes is the high impedance direction H. In addition, a small number of the carbon nanotubes are randomly arranged in the carbon nanotube film. The randomly arranged carbon nanotubes are in contact with the adjacent carbon nanotubes, thus, the carbon nanotube film at the high impedance direction H has the conductivity lower than that of the carbon nanotube film at the other directions.

A material of the first driving-sensing electrodes 106 can be conductive material. The conductive material can be metal, conductive polymer, conductive slurry, conductive gel, metallic carbon nanotubes, or indium tin oxide. A structure or a shape of the first driving-sensing electrodes 106 is not limited. The shape of the first driving-sensing electrodes 106 can be laminar shape, strip shape, blocky shape, rod shape, or other shape. In one embodiment, the first driving-sensing electrodes 106 are printed silver electrodes having a strip shape. In one embodiment, distances between the adjacent first driving-sensing electrodes 106 can be both in a range from about 3 millimeters (mm) to about 5 mm. A length direction of the first driving-sensing electrodes 106 can be substantially parallel to the high impedance direction H. The length of each of the first driving-sensing electrodes 106 can be in a range from about 1 mm to about 5 mm. Quantities of the first driving-sensing electrodes 106 are not limited and can be determined by a size of the conductive film 104. In one embodiment, the quantities of the first driving-sensing electrodes 106 are both six, the length of each of the first driving-sensing electrodes 106 is 1 mm, and the distances between the adjacent first driving-sensing electrodes 106 are both 3 mm.

The driving circuit 120 includes a charging circuit 122 and a first switch 124 for controlling the charging circuit 122. The charging circuit 122 is electrically connected with the first driving-sensing electrode 106 in series by the first switch 124. The charging circuit 122 can be connected with a voltage source (not shown). The sensing circuit 130 includes a storage circuit 1320, a reading circuit 134, and a second switch 136 for controlling the storage circuit 1320 and the reading circuit 134. The storage circuit 1320 and the reading circuit 134 are electrically connected with each other in parallel, and are connected with the first driving-sensing electrode 106 in series by the second switch 136. The driving circuit 120 and the sensing circuit 130 are connected with each other in parallel. The storage circuit 1320 can further be connected with a resistor (not shown) in series. The storage circuit 1320 is grounded by the resistor.

Furthermore, a transparent protective film 110 can be disposed on the conductive film 104 of the touch panel 10. A material of the transparent protective film 110 can be silicon nitride, silicon oxide, benzo cyclo butene (BCB), polyester or acrylic resin. The transparent protective film 110 can be a hardened plastic layer having a smooth scratch-resistant surface. In one embodiment, the material of the transparent protective film 110 is polyethylene terephthalate (PET). The transparent protective film 110 is used to protect the conductive film 104, thereby improving a durability of the touch panel 10. The transparent protective film 110 can be also used to decrease glare or reflection.

Furthermore, an adhesive layer (not shown) can be disposed between the conductive film 104 and the substrate 102 to firmly adhere the conductive film 104 and the substrate 102. The adhesive layer can also be disposed between the conductive film 104 and the transparent protective film 110 to firmly adhere the conductive film 104 and the transparent protective film 110. A material of the adhesive layer can be optical cement or UV adhesive.

Referring to FIG. 3, if a conductive object touches the touch panel 10, a circuit is composed of the resistance of the conductive film 104 between the touch spot and each first driving-sensing electrode 106 and the coupling capacitor 114. The $R_{1n}$ of the conductive film 104 between the touch spot and the different first driving-sensing electrodes 106 are different due to the position difference of the first driving-sensing electrodes 106. The $R_{1n}$ of the conductive film 104 between the touch spot and the nearest first driving-sensing electrode 106 is less than the other $R_{1n}$ of the conductive film 104 between the touch spot and the other first driving-sensing electrodes 106 due to the anisotropy of impedance of the conductive film 104. Each of the first driving-sensing electrodes 106 can detect one $R_{1n}C$ value. A coordinate of the touch spot at the high impedance direction H can be detected by the $R_{1n}C$ values. A coordinate of the touch spot at the low impedance direction D can be detected by computing a ratio of the $R_{1n}C$ detected by the first driving-sensing electrodes 106 and the capacitance C to obtain the resistance $R_{1n}$ of the conductive film 104 between the touch spot and the first driving-sensing electrodes 106. A function relation exists between the resistance of the conductive film between one spot and the first side 111 and the position of the spot. Thus, the coordinate of the touch spot at the low impedance direction D can be calculated according to the function relation.

A detecting process of the touch spot of the touch panel 10 is specifically described as follows.

Step S1

The $R_{1n}C$ is a product of the resistance $R_{1n}$ and the capacitance value C ($R_{1n}C$). The pulse signals can be inputted into the first driving-sensing electrodes 106 one by one or at the same time, and the $R_{1n}C$ values can be detected one by one or at the same time. The first curve composed by the $R_{1n}C$ values referring to the positions of the corresponded first driving-sensing electrodes 106 along the high impedance direction H can be then drawn. When the pulse signals are inputted into the first driving-sensing electrodes 106 one by one, the other first driving-sensing electrodes 106 without being inputted into the impulse signals are grounded. In addition, when the pulse signals are inputted into the first driving-sensing electrodes 106 one by one or at the same time, all the second driving-sensing electrodes 108 can be grounded, or inputted into the pulse signals one by one or at the same time.

Figure 4:
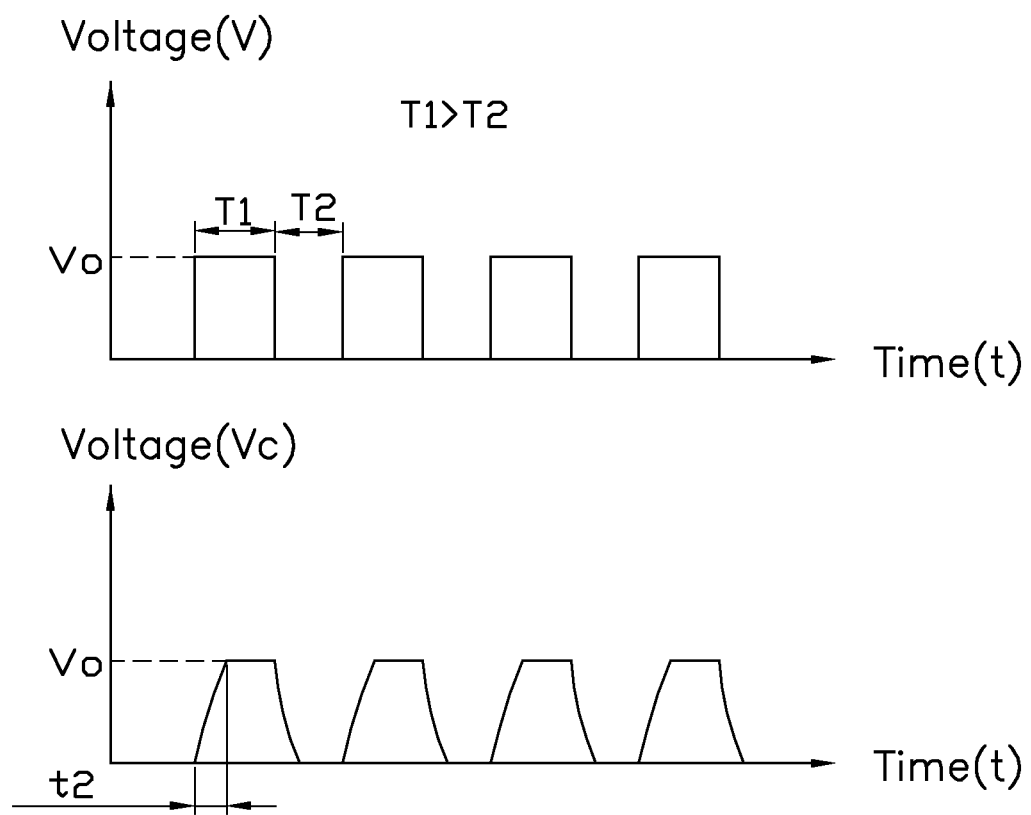
FIG. 4 shows voltage waveforms formed at one embodiment of a touch spot.

The pulse signals can be inputted by controlling the first switch 124 and the second switch 136. Specifically, the first switch 124 and the second switch 136 can be alternately turned on to form the pulse signals. Referring to FIG. 4, V represents a voltage inputted into the conductive film 104 by the driving circuit 120, $V_C$ represents a voltage of the coupling capacitor 114. An opening period of the first switch 124 can be T1. An opening period of the second switch 136 can be T2. In the T1, the first switch 124 is turned on, and the second switch 136 is turned off. In the T2, the first switch 124 is turned off, and the second switch 136 is turned on. The T1 can be larger than or equal to the T2. In one embodiment, the T1 is larger than the T2.

When the first switch 124 and the second switch 136 are alternately turned on, the coupling capacitor 114 can be alternately charged and discharged by the charging circuit 122 and the storage circuit 1320. In the T1, the charging circuit 122 inputs a voltage $V_0$ ($V=V_0$) into the conductive film 104 by the first driving-sensing electrode 106 to charge the coupling capacitor 114. In the T2, the coupling capacitor 114 is discharged to the storage circuit 1320, and correspondingly, a voltage of the storage circuit 1320 changes.

In the T1, the coupling capacitor 114 is gradually charged to a steady state after a transient state of a period t1. In the t1, the voltage $V_C$ of the coupling capacitor 114 gradually increases to a constant voltage $V_0$ (at this time, $V_C=V_0$). In the T2, the coupling capacitor 114 is gradually discharged after a transient state of a period t1. During the transient state when the coupling capacitor 114 being charged or discharged, a voltage of the resistor in the storage circuit 1320 will correspondingly change. The reading circuit 134 can detect the voltage of the resistor in the storage circuit 1320 in the transient state of the coupling capacitor 114 and calculate the $R_{1n}C$ value at some time spot during t1. The calculating formula can be $$V_C = V_0 \times \left(1 - e^{-\frac{t}{R_{1n}C}}\right),$$

wherein t represents a rise period of the voltage from 0 to $V_C$ of the coupling capacitor 114 in the transient state. When the pulse signals are inputted into each of the first driving-sensing electrodes 106, the reading circuit 134 connected with each of the first driving-sensing electrodes 106 can calculate one $R_{1n}C$ value during charging or discharging of the coupling capacitor 114 in the transient state. Thus, the first curve (an $R_{1n}C$ value changes curve) can be simulated. A coordinate of the touch spot at high impedance direction H can be detected by the first curve.

A detailed detecting process for detecting one signal touch spot or a plurality of touch spots is described as follows.

A Detecting Process of a Single Touch Spot

Figure 5:
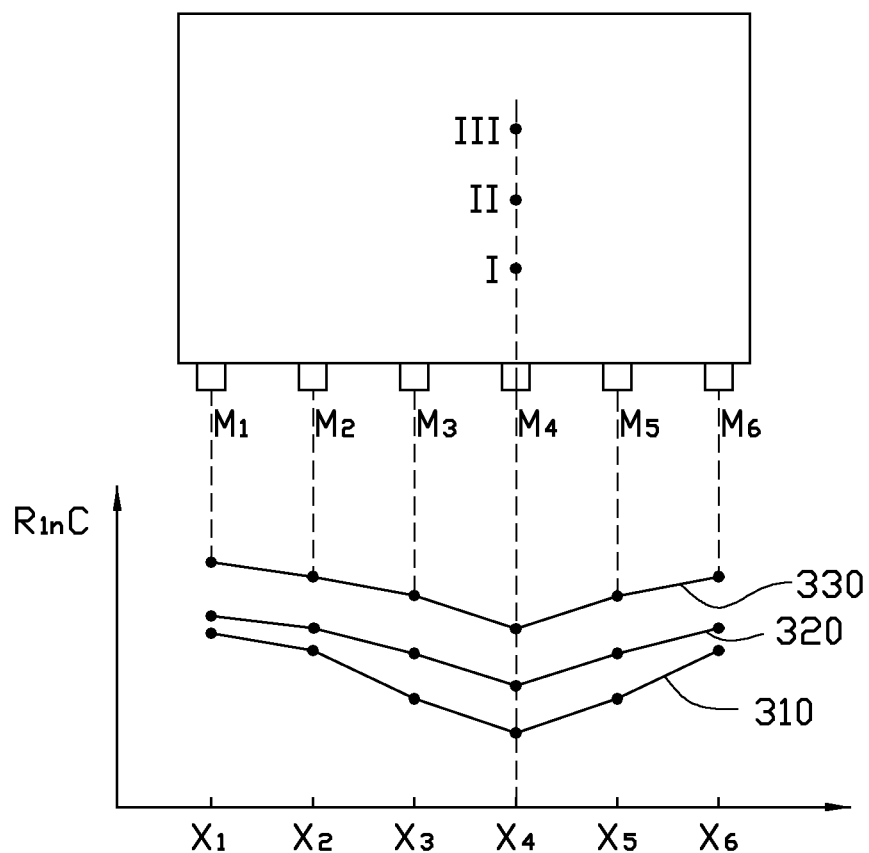
FIG. 5 shows three first curves in three simulation tests for detecting non-simultaneous touch spots I, II, and III on the touch panel.
Figure 6:
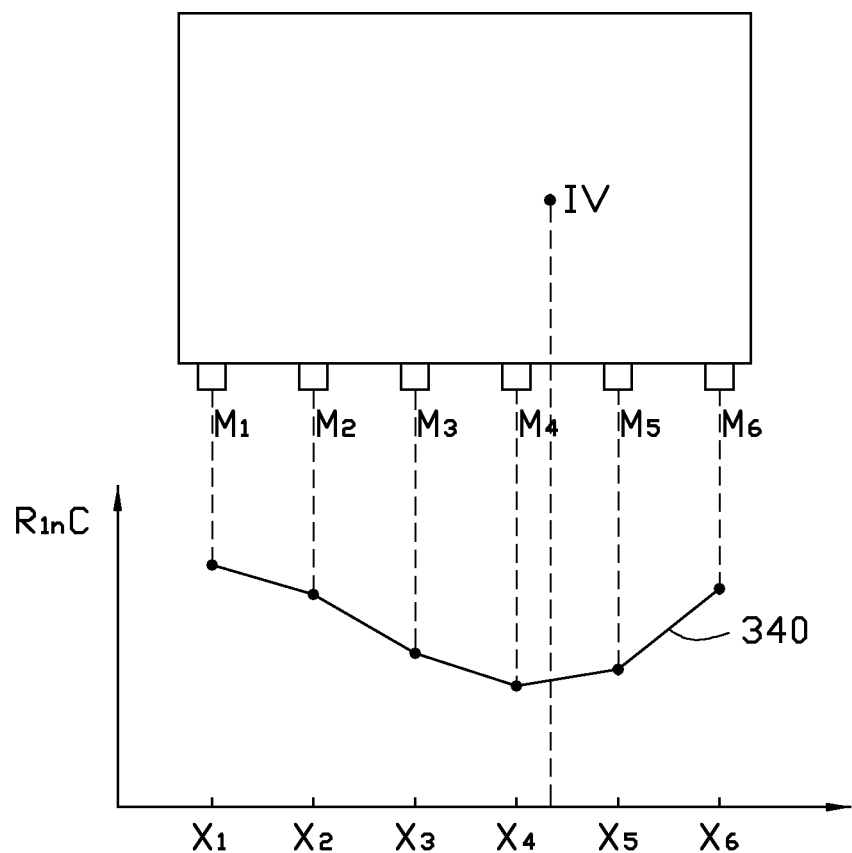
FIG. 6 shows one first curve in another simulation test for detecting touch spot IV on the touch panel.
Figure 7:
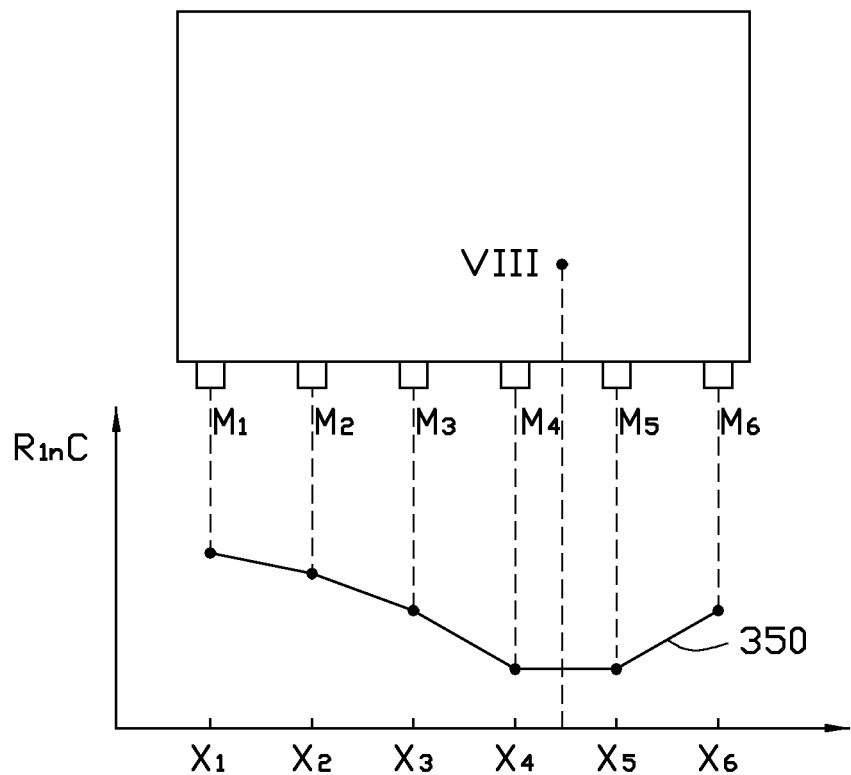
FIG. 7 shows one first curve in another simulation test for detecting touch spot VIII on the touch panel.

Referring to FIGS. 5 to 7, five touch spots I~V are detected. The five touch spots I~V are formed at different time. Namely, a single touch spot is formed on the touch panel 10 at a certain time. The coordinates of the touch spots I~V at the high impedance direction H can be detected by the first curves.

The first driving-sensing electrodes 106 are sequentially represented by M1, M2, M3, M4, M5, and M6. The coordinates of the first driving-sensing electrodes 106 at the high impedance direction H can be sequentially represented by X1, X2, X3, X4, X5, and X6. In the $R_{1n}C$ value, n is equal to 1, 2, . . . , or 6. The $R_{11}C$ value can be detected by M1. The $R_{12}C$ value can be detected by M2. The $R_{13}C$ value can be detected by M3. The $R_{14}C$ value can be detected by M4. The $R_{15}C$ value can be detected by M5. The $R_{16}C$ value can be detected by M6.

The touch spots I~III sequentially occur along the low impedance direction D and on a straight line having the M4. The touch spot II is located in a middle position of the straight line having the M4. The touch spots I and III are symmetrical compared with the touch spot II.

The touch spot IV is located at a side of the straight line defined by the touch spots I~III and near the electrode M5. A perpendicular distance between the touch spot IV and the straight line having the M4 thereon along the low impedance direction D is less than a perpendicular distance between the touch spot IV and another straight line having the M5 thereon along the low impedance direction D.

The touch spot VIII is nearer to the M5 than the touch spot IV. A perpendicular distance between the touch spot V and the straight line having the M4 thereon along the low impedance direction D is equal to a perpendicular distance between the touch spot VIII and another straight line having the M5 thereon along the low impedance direction D. A distance between the touch spot VIII and the first side 111 is less than a distance between the touch spot VIII and the second side 112.

(1) A Detecting Process of the Touch Spots I~III

Referring to FIG. 5, the first curve 310 shows the $R_{1n}C$ value change curve varied with the high impedance direction H when the touch spot I is touched. The touch spot I is opposite to the M4 and the $R_{14}$ is the smallest. Thus, the $R_{14}C$ value is the smallest in the first curve 310 and detected by the M4 opposite to the touch spot I and located at a valley of the first curve 310. The $R_{15}C$ value detected by the M5 and the $R_{13}C$ value detected by the M3 are equal and much large than the $R_{14}C$ value. The larger the distance between the first driving-sensing electrodes 106 and the touch spot I, the larger the $R_{1n}C$ values detected by the first driving-sensing electrodes 106, and the smaller a fluctuation amplitude of the first curve 310. A curve shape of the first curve 310 is symmetrical compared with the straight line having the valley thereon along the low impedance direction D. The coordinate of the touch spot I at the high impedance direction H is X4 which can be determined by the curve shape of the first curve 310. In addition, the coordinate of the touch spot I at the high impedance direction H can also be calculated by an interpolation method. The formula of the interpolation method is as follows:

$$X_I = \frac{X_3 \Delta R_{13}C + X_5 \Delta R_{15}C}{\Delta R_{13}C + \Delta R_{15}C},$$

$$X_I = \frac{X_3 \Delta R_{13}C + X_4 \Delta R_{14}C + X_5 \Delta R_{15}C}{\Delta R_{13}C + \Delta R_{14}C + \Delta R_{15}C},$$

or $$X_I = \frac{\sum_{n=1}^{E} X_{1n} \Delta R_{1n}C}{\sum_{n=1}^{E} \Delta R_{1n}C}.$$

In one embodiment, the coordinate of the touch spot I at the high impedance direction H is calculated by the formula:

$$X_I = \frac{X_3 \Delta R_{13}C + X_5 \Delta R_{15}C}{\Delta R_{13}C + \Delta R_{15}C}.$$

In the above formula, E is the total number of the first driving-sensing electrodes 106, $\Delta R_{1n}C = R_{1k}C - R_{1n}C$, $R_{1k}C$ represents the largest $R_{1n}C$ value. In one embodiment, E is equal to 6. It can be shown that $R_{1k}C$ value is $R_{11}C$ from the FIG. 5 when the touch spot I is detected.

The first curve 320 is the $R_{1n}C$ value change curve when the touch spot II is detected. The first curve 330 is the $R_{1n}C$ value change curve when the touch spot III is detected. The curve shapes of the first curve 320 and the first curve 330 are similar with that of the first curve 310. The resistance $R_{1n}$ between the touch spot II or III and the first driving-sensing electrodes 106 is larger than the resistance $R_{1n}$ between the touch spot I and the first driving-sensing electrodes 106. Thus, the $R_{1n}C$ value detected by the first driving-sensing electrode 106 when the touch spot II or III is detected is larger than the $R_{1n}C$ value detected by the same first driving-sensing electrode 106 when the touch spot I is detected. The coordinates of the touch spot II and III at the high impedance direction H can be calculated by the above formula.

Thus, three $R_{1n}C$ values in the first curve can be selected and compared. The selected three $R_{1n}C$ values are less than the other $R_{1n}C$ values in the first curve. If two $R_{1n}C$ values are equal in the three $R_{1n}C$ values, and the two first driving-sensing electrodes 106 for detecting the two same $R_{1n}C$ values are symmetrical compared with the another first driving-sensing electrode 106, the coordinate of the touch spot at the high impedance direction H is equal to the coordinate of the another first driving-sensing electrode 106 at the high impedance direction H. The coordinate of the touch spot can be directly read or calculated by the interpolation method.

(2) A Detecting Process of the Touch Spot IV

Referring to FIG. 6, the first curve 340 is the $R_{1n}C$ value change curve when the touch spot IV is detected. The touch spot IV is located on a side of the straight line defined by the touch spots I~III and near M5. A perpendicular distance between the touch spot IV and the straight line having the M4 thereon along the low impedance direction D is less than the perpendicular distance between the touch spot IV and the straight line having the M5 thereon along the low impedance direction D. Thus, the $R_{14}C$ value detected by the M4 is less than the $R_{15}C$ value detected by the M5. The $R_{13}C$ value detected by the M3 is larger than the $R_{15}C$ value detected by the M5. The $R_{1n}C$ values detected by the other first driving-sensing electrodes 106 are much larger than the $R_{1n}C$ values (n=3, 4, or 5) detected by the M3, M4, or M5, and the change amplitude decreases. Thus, it can be concluded by the first curve that the touch spot IV is located between the straight line having the M4 thereon and the straight line having the M5 thereon and near M4. Furthermore, the coordinate of the touch spot IV at the high impedance direction H can be accurately calculated by the interpolation method. The specific formula can be $$X_{IV} = \frac{\sum_{n=1}^{E} X_{1n}\Delta R_{1n}C}{\sum_{n=1}^{E} \Delta R_{1n}C},$$

wherein $\Delta R_{1n}C = R_{1k}C - R_{1n}C$, $R_{1k}C$ is the largest $R_{1n}C$ value detected by the first driving-sensing electrodes 106. In one embodiment, E is equal to 6. Referring to FIG. 6, the $R_{1k}C$ is $R_{11}C$ when the touch spot I is detected.

In addition, the $R_{11}C$ value detected by the M1, the $R_{12}C$ value detected by the M2, and the $R_{16}C$ value detected by the M6 are larger than the $R_{1n}C$ values detected by the other first driving-sensing electrodes 106, and the change amplitude is much smaller. Thus, the coordinate of the touch spot IV at the high impedance direction H can be accurately calculated by the follow formula:

$$X_{IV} = \frac{X_3\Delta R_{13}C + X_4\Delta R_{14}C + X_5\Delta R_{15}C}{\Delta R_{13}C + \Delta R_{14}C + \Delta R_{15}C},$$

or $$X_{IV} = \frac{X_4\Delta R_{14}C + X_5\Delta R_{15}C}{\Delta R_{14}C + \Delta R_{15}C}.$$

In one embodiment, the coordinate of the touch spot IV at the high impedance direction H is calculated by the formula $$X_{IV} = \frac{X_3\Delta R_{13}C + X_4\Delta R_{14}C + X_5\Delta R_{15}C}{\Delta R_{13}C + \Delta R_{14}C + \Delta R_{15}C}.$$

(3) A Detecting Process for Detecting the Touch Spot VIII

Referring to FIG. 7, the first curve 350 is the $R_{1n}C$ value change curve when the touch spot VIII is detected. The perpendicular distance between the touch spot VIII and the straight line having the M5 thereon along the low impedance direction D is equal to the perpendicular distance between the touch spot VIII and the straight line having the M5 thereon along the low impedance direction D. Thus, the $R_{14}C$ value detected by the M4 is equal to the $R_{15}C$ value detected by the M5, and the $R_{13}C$ value detected by the M3 is equal to the $R_{16}C$ value detected by the M6. The $R_{13}C$ value and the $R_{16}C$ value are larger than the $R_{14}C$ value and the $R_{15}C$ value. Thus, it can be concluded that the touch spot VIII is located on a central axis of a straight line defined by the M4 and the M5, and the coordinate of the touch spot VIII at the high impedance direction H can be determined. In addition, the coordinate of the touch spot VIII can be calculated by the follow formula:

$$X_{VIII} = \frac{X_4\Delta R_{14}C + X_5\Delta R_{15}C}{\Delta R_{14}C + \Delta R_{15}C},$$

$$X_{VIII} = \frac{X_4\Delta R_{14}C + X_5\Delta R_{15}C + X_6\Delta R_{16}C}{\Delta R_{14}C + \Delta R_{15}C + \Delta R_{16}C},$$

$$X_{VIII} = \frac{X_4\Delta R_{14}C + X_5\Delta R_{15}C + X_3\Delta R_{13}C}{\Delta R_{14}C + \Delta R_{15}C + \Delta R_{13}C},$$

or $$X_{VIII} = \frac{\sum_{n=1}^{E} X_{1n}\Delta R_{1n}C}{\sum_{n=1}^{E} \Delta R_{1n}C},$$

wherein $\Delta R_{1n}C = R_{1k}C - R_{1n}C$, $R_{1k}C$ is the largest $R_{1n}C$ value detected by the first driving-sensing electrodes 106. In one embodiment, E is equal to 6. Referring to FIG. 7, the $R_{1k}C$ is $R_{11}C$ when the touch spot I is touched.

Thus, if the coordinate of the single touch spot at the high impedance direction H cannot be determined only by the first curve, the coordinate can be detected by the following steps:

S31, at least selecting the largest $R_{1k}C$ value, the smallest $R_{1x}C$ value in the valley of the first curve, a second small $R_{1y}C$ value;

S32, calculating the coordinate of the touch spot at the high impedance direction H by using the smallest $R_{1x}C$ value, the second small $R_{1y}C$ value, the coordinate of the first driving-sensing electrode 106 for detecting the smallest $R_{1n}C$ value at the high impedance direction H, the coordinate of the first driving-sensing electrode 106 for detecting the second small $R_{1y}C$ value at the high impedance direction H in the interpolation method.

In the step S31, the second small $R_{1y}C$ value is only larger than or equal to the smallest $R_{1x}C$ value and less than the other $R_{1n}C$ values in all the $R_{1n}C$ values detected by the first driving-sensing electrodes 106. If the coordinate of the single touch spot at the high impedance direction H cannot be determined only by the first curve, the second small $R_{1y}C$ value is larger than the smallest $R_{1x}C$ value. In the step S32, the formula of the interpolation method is $$\frac{X_x \Delta R_{1x}C + X_y \Delta R_{1y}C}{\Delta R_{1x}C + \Delta R_{1y}C},$$

wherein $\Delta R_{1x}C = R_{1k}C - R_{1x}C$, $\Delta R_{1y}C = R_{1k}C - R_{1y}C$, $X_x$ represents the coordinate of the first driving-sensing electrode 106 for detecting the smallest $R_{1x}C$ value, $X_y$ represents the coordinate of the first driving-sensing electrode 106 for detecting the second small $R_{1y}C$ value.

In addition, the coordinate of the touch spot at the high impedance direction H can be directly detected by the first curve or the interpolation method. Specifically, if the $R_{1x}C$ value and the second small $R_{1y}C$ value are equal in the first curve, the coordinate of the touch spot can be calculated by the formula $$\frac{X_x \Delta R_{1x}C + X_y \Delta R_{1y}C}{\Delta R_{1x}C + \Delta R_{1y}C}.$$

If the $R_{1x}C$ value and the second small $R_{1y}C$ value are not equal, a third small $R_{1z}C$ value can be selected. The third small $R_{1z}C$ value and the second small $R_{1y}C$ value are equal, the coordinate of the touch spot can be calculated by using the $R_{1z}C$ value, the $R_{1y}C$ value, the coordinate $X_z$ of the first driving-sensing electrode 106 for detecting the $R_{1z}C$ value, and the coordinate of the first driving-sensing electrode 106 for detecting the $R_{1y}C$ value in the interpolation method. The formula is $$\frac{X_z \Delta R_{1z}C + X_y \Delta R_{1y}C}{\Delta R_{1z}C + \Delta R_{1y}C},$$

wherein the $R_{1y}C$ value is equal to the $R_{1z}C$ value, and $\Delta R_{1z}C = R_{1k}C - R_{1z}C$.

In addition, the coordinates of the above touch spots can be detected by only selecting three $R_{1n}C$ values in the first curve, and using the three $R_{1n}C$ values and the coordinates of the three corresponding first driving-sensing electrodes 106 at the high impedance direction H in the interpolation method. The formula for calculating the coordinate can be $$\frac{X_x \Delta R_{1x}C + X_y \Delta R_{1y}C + X_Z \Delta R_{1Z}C}{\Delta R_{1x}C + \Delta R_{1y}C + \Delta R_{1Z}C}.$$

The smallest $R_{1x}C$ value and the second small $R_{1y}C$ value can be the same or different, and the second small $R_{1y}C$ value and the third small $R_{1z}C$ value can be the same or different. In addition, the coordinate of the touch spot can be calculated by using all the $R_{1n}C$ values in the first curve and the coordinates of all the first driving-sensing electrodes 106 at the high impedance direction H in the interpolation method, wherein the formula of the interpolation method can be $$\frac{\sum_{n=1}^{E} X_{1n} \Delta R_{1n}C}{\sum_{n=1n}^{E} \Delta R_{1n}C},$$

wherein E is the total number of the first driving-sensing electrodes 106.

A Detecting Process for Detecting the Plurality of Touch Spot

Figure 8:
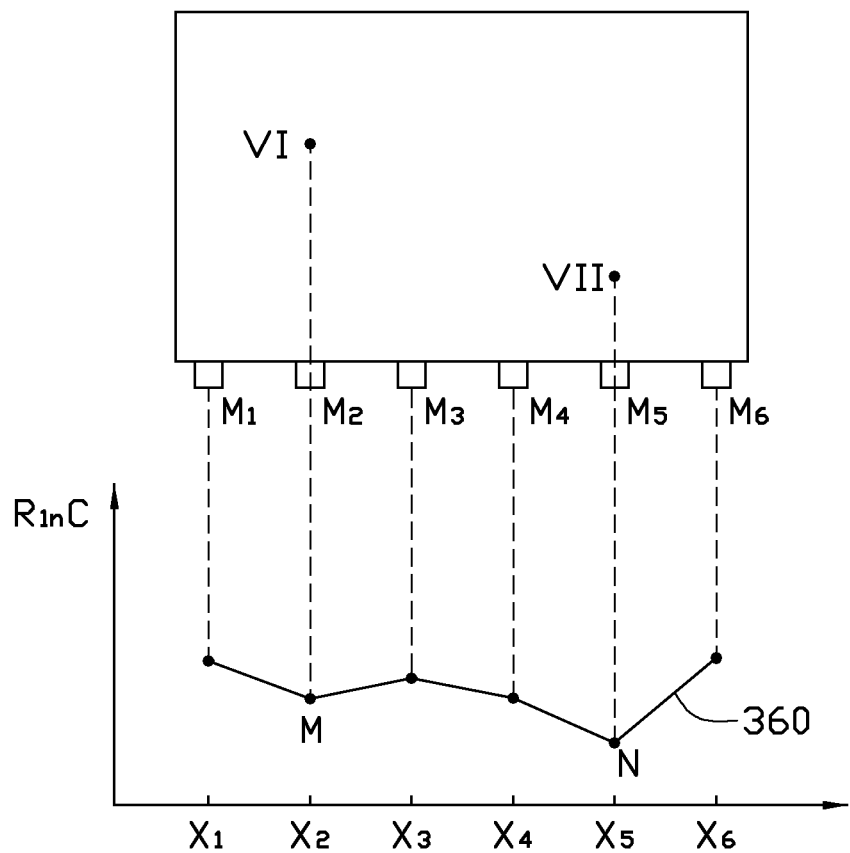
FIG. 8 shows one first curve in another simulation test for detecting simultaneous touch spots VI and VII.
Figure 9:
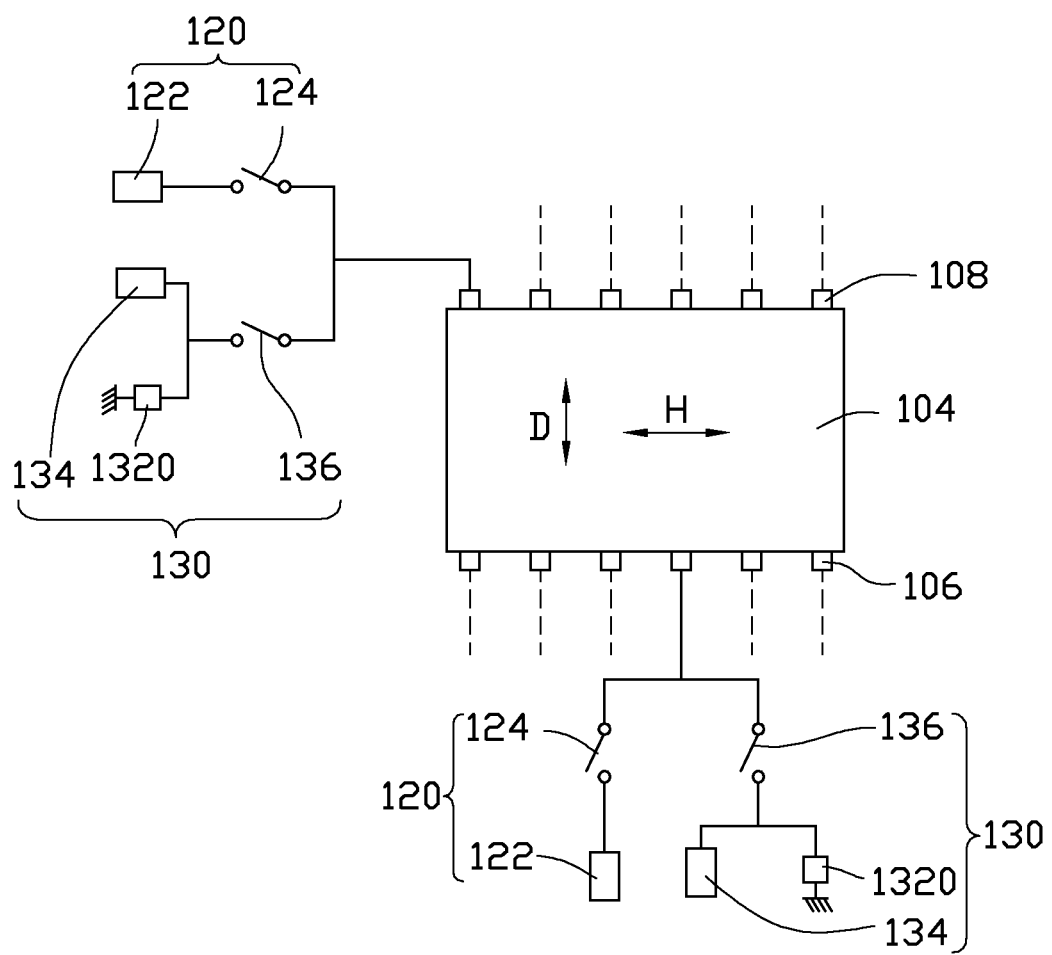
FIG. 9 shows a schematic view of another embodiment of a driving circuit and a sensing circuit electrically connected with each driving-sensing electrode of the touch panel.

Referring to FIG. 8, if the touch spots VI and VII are simultaneously formed on the touch panel. The pulse signals can be sequentially or simultaneously inputted into the first driving-sensing electrodes 106 by the driving circuits 120. The sensing circuits 130 can read the $R_{1n}C$ values. The first curve 360 can be composed of the $R_{1n}C$ values varied along the high impedance direction H. It is clearly shown that the first curve 360 is different from the simulated first curves when detecting a single touch (e.g., in FIGS. 5 to 7). Two valleys M and N appear on the first curve 360. The $R_{1M}C$ value is corresponding to the valley M, and the $R_{1N}C$ value is corresponding to the valley N. The other $R_{1n}C$ values detected by the other first driving-sensing electrodes 106 are larger than the $R_{1M}C$ value and the $R_{1N}C$ value. Then, the $R_{1(M+1)}C$ value and the $R_{1(M-1)}C$ value detected by the first driving-sensing electrodes 106 adjacent to the first driving-sensing electrode 106 for detecting the $R_{1M}C$ value are selected. The $R_{1(N+1)}C$ value and the $R_{1(N-1)}C$ value detected by the first driving-sensing electrodes 106 adjacent to the first driving-sensing electrode 106 detecting the $R_{1N}C$ value are selected. Referring to FIG. 9, the $R_{11}C$ value, the $R_{12}C$ value, and the $R_{13}C$ value are respectively detected by the first driving-sensing electrodes M1, M2, and M3 corresponding to the valley M. The $R_{14}C$ value, the $R_{15}C$ value, and the $R_{16}C$ value are respectively detected by the first driving-sensing electrodes M4, M5, and M6 corresponding to the valley N. The coordinate of each of the touch spots can be calculated by using the three $R_{1n}C$ values corresponding to the valley in the first curve, and the coordinates of the three first driving-sensing electrodes corresponding to the three $R_{1n}C$ values in the interpolation method. The formula of the interpolation method for calculating the touch spots VI and VII at the high impedance direction H is the same as the formula of the interpolation method for calculating the coordinate of the single touch spot.

Thus, if the coordinates of the plurality of touch spots at the high impedance direction H cannot be directly read by the first curve, the coordinates of the plurality of touch spots can be detected by the following steps: S31, simulating the first curve composed of the $R_{1n}C$ values detected by the first driving-sensing electrodes 106; S32, selecting a plurality of smallest $R_{1n}C$ value ($R_{1x1}C, R_{1x2}C, \ldots R_{1xm}C$) corresponding to a plurality of valleys from the first curve, and a plurality of adjacent $R_{1y1}C, R_{1y2}, \ldots R_{1ym}$ values adjacent to the $R_{1x1}C, R_{1x2}C, \ldots R_{1xm}C$; S33, calculating the coordinates of the plurality of touch spots by using the $R_{1xm}C$ value, the $R_{1ym}C$ value, the coordinates of the first driving-sensing electrodes 106 detecting the $R_{1xm}C$ value and the $R_{1ym}$ value at the high impedance direction H in the interpolation method.

The conductive film 104 has anisotropy of impedance. The plurality of first driving-sensing electrodes 106 are disposed on a side of the conductive film 104 and arranged along the high impedance direction H. The resistance value $R_{1n}$ between the touch spot and the nearest first driving-sensing electrode 106 is less than the resistance values $R_{1n}$ between the touch spot and the other first driving-sensing electrodes 106 due to the anisotropy of impedance. Thus, there is a larger difference between the $R_{1n}C$ values detected by the adjacent first driving-sensing electrodes, which will improve an accuracy of the method for detecting the coordinate of the touch spot. If a plurality of touch spots are detected, a detecting interference between the plurality of touch spots is small. Thus, the touch spot is easy to be located.

Step S2

When the coupling capacitor 114 is in the steady state, the capacitance C of the coupling capacitor 114 can be calculated by detecting a voltage of the capacitor 1320 in the steady state.

Step S3

When the coordinate of the touch spot at the high impedance direction is known, the coordinate of the touch spot at the low impedance direction D can be calculated according to the function relation between the resistance $R_{1n}$ and the coordinate of the touch spot at the low impedance direction D. The resistance $R_{1n}$ between the touch spot and the first driving electrodes 106 can be calculated by comparing the $R_{1n}C$ values with the capacitance C.

If the conductive film is different, the function relation can be different. The function relation can be obtained by statistical analysis method. The function relation is a relation among:

(1) a difference between the coordinate of the touch spot at the high impedance direction H and the coordinate of each the first driving-sensing electrode 106 at the high impedance direction H, (2) the coordinate of the touch spot at the low impedance direction D, and (3) the resistance $R_{1n}$ of the conductive film 104 between each the first driving-sensing electrode 106 and the touch spot.

The coordinate of the touch spot at the low impedance direction D can be calculated by input the resistance $R_{1n}$ of the conductive film 104 between each of the first driving-sensing electrode 106 and the touch spot, and input the coordinate of the touch spot at the high impedance direction H to the function relation. If the conductive film 104 is a single carbon nanotube film drawn from the carbon nanotube array, the function relation is $$y = \frac{R_{1n} 2^{\Delta x} A}{R_A},$$

wherein A represents a total length of the conductive film 104 along the low impedance direction D, $R_A$ represents a total resistance of the conductive film 104 at the low impedance direction D, $\Delta x$ represents a difference between the coordinate of the touch spot at the high impedance direction H and the coordinate of each first driving-sensing electrode 106 at the high impedance direction H, y is the coordinate of the touch spot at the low impedance direction D.

The coordinates of the above touch spots I, II, III, IV, VIII at the low impedance direction D can be obtained by the step S2. The coordinates of the touch spots VI and VII at the low impedance direction D can be calculated by the function relation.

The detecting process of the step S1 and the step S2 can be respectively or simultaneously executed.

Thus, the coordinate of the touch spot at the high impedance direction H can be obtained by detecting the $R_{1n}C$ values. The coordinate of the touch spot at the low impedance direction D can be obtained by calculating the resistance $R_{1n}$ of the conductive film between the touch spot and each the first driving-sensing electrode 106 at the high impedance direction H, and input the resistance $R_{1n}$, the difference between the coordinate of the touch spot at the high impedance direction H and the coordinate of each the first driving-sensing electrode 106 at the high impedance direction H to the function relation.

Referring to FIG. 9 in another embodiment of the method for detecting the touch spot of the touch panel 10, the touch panel 10 further includes a plurality of second driving-sensing electrodes 108. The second driving-sensing electrodes 108 are spaced from each other and arranged along the second side 112. The second driving-sensing electrodes 108 and the first driving-sensing electrodes 106 can be opposite one to one, or alternately arranged. If the second driving-sensing electrodes 108 and the first driving-sensing electrodes 106 are opposite one to one, a direction from one first driving-sensing electrode 106 to one second driving-sensing electrode 108 opposite to the first driving-sensing electrode 106 is substantially parallel to the low impedance direction D. If the second driving-sensing electrodes 108 and the first driving-sensing electrodes 106 are alternately arranged, a direction from each of the first driving-sensing electrodes 106 to one of the second driving-sensing electrodes 108 is not parallel to the low impedance direction D. A resistance of the conductive film 104 between the touch spot and the second driving-sensing electrodes 108 can be represented by $R_{21}, R_{22}, \ldots R_{2n}$ (n=1, 2, 3 . . . ). Each of the second driving-sensing electrodes 108 is electrically connected with one driving circuit 120 and one sensing circuit 130.

In one embodiment, the second driving-sensing electrodes 108 and the first driving-sensing electrodes 106 are opposite one to one. A material, a shape, or a disposed mode of the second driving electrodes 108 can be the same as the material, the shape, or the disposed mode of the first driving electrodes 106.

The detecting method includes:

N1, inputting a pulse signal into each first driving-sensing electrode 106 by the driving circuit 120, and reading $R_{1n}C$ detected by each sensing circuit 130, thereby simulating a first curve of the $R_{1n}C$ along the high impedance direction H; and N2, inputting a pulse signal into each second driving-sensing electrode 108 by the driving circuit 120, and reading $R_{2n}C$ detected by each sensing circuit 130, thereby simulating a second curve of the $R_{2n}C$ along the high impedance direction H;

N3, comparing one $R_{1n}C$ in the first curve with one $R_{2n}C$ in the second curve corresponding to a same coordinate at the high impedance direction H, using the second curve to detect the coordinate of the conductive film 104 at the high impedance direction H when the compared $R_{1n}C$ is larger than the compared $R_{2n}C$; and N4, calculating a coordinate of the touch spot at the low impedance direction D by computing a ratio of the $R_{2n}C$ detected by the second driving-sensing electrodes 106 and the capacitance C to obtain the resistance $R_{2n}$ of the conductive film 104 between the touch spot and the second driving-sensing electrodes 106.

In the step N1, the pulse signals are inputted into the plurality of first driving-sensing electrodes one by one or at the same time. When the pulse signals are inputted into the first driving-sensing electrodes 106 one by one, the other first driving-sensing electrodes 106 are grounded or connected to a fixed potential. In addition, when the pulse signals are inputted into the first driving-sensing electrodes 106 one by one or at the same time, all the second driving-sensing electrodes 108 can be grounded, or inputted into the pulse signals one by one or at the same time.

In the step N3, when the compared $R_{1n}C$ is larger than the compared $R_{2n}C$, a distance between the touch spot and the first side 111 is larger than a distance between the touch spot and the second side 112, the coordinate of the touch spot at the high impedance direction H can be determined by the second curve. When the compared $R_{1n}C$ is less than the compared $R_{2n}C$, the distance between the touch spot and the first side 111 is less than the distance between the touch spot and the second side 112, and the coordinate of the touch spot at the high impedance direction H can be determined by the first curve. If an area of the touch panel 10 is larger, and the touch spot is nearer from the second driving-sensing electrodes 108 than the first driving-sensing electrodes 106, a change amplitude of the second curve is larger than a change amplitude of the first curve. Thus, the coordinate of the touch spot at the low impedance direction D or at the high impedance direction H can be much more accurately determined by the second curve. The detailed detecting process is the same as the above embodiment.

In the method for detecting the touch spot of the touch panel, the structure of the touch panel having only one conductive layer is simpler than that of the traditional touch panel, and has a small thickness. The method for detecting the touch spot can detect one single touch spot or the plurality of touch spot.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for detecting touch spot of touch panel, the touch panel comprising:
   a substrate;
   a conductive film disposed on the substrate, wherein the conductive film is impedance anisotropic and defines a low impedance direction and a high impedance direction substantially perpendicular to the low impedance direction, the conductive film has a first side substantially perpendicular to the low impedance direction;
   a plurality of first driving-sensing electrodes arranged along the first side and spaced from each other;
   wherein the plurality of first driving-sensing electrodes are electrically connected with the conductive film, each of the plurality of first driving-sensing electrodes is electrically connected with a driving circuit and a sensing circuit, when the touch panel is touched by a conductive object at a touch spot, a coupling capacitance having a capacitance value C between the conductive film and the conductive object is formed, a resistance of the conductive film between a touch spot and each of the plurality of first driving-sensing electrodes is represented by $R_{11}$, $R_{12}$, ... $R_{1n}$ (n=1, 2, 3, ...);
   the method comprising:
   inputting a pulse signal into each of the plurality of first driving-sensing electrodes by the driving circuit, and reading a $R_{1n}C$ value detected by each of the sensing circuits, thereby simulating a first curve of $R_{1n}C$ values along the high impedance direction to compute a coordinate of the touch spot at the high impedance direction;
   detecting the capacitance C of the coupling capacitance by the sensing circuit; and
   calculating a coordinate of the touch spot at the low impedance direction by computing a ratio of the $R_{1n}C$ detected by the plurality of first driving-sensing electrodes to the capacitance C to obtain the resistance $R_{1n}$ of the conductive film between the touch spot and the first driving-sensing electrodes.

2. The method as claimed in claim 1, wherein the step of computing the coordinate of the touch spot at the high impedance direction comprises:
   selecting a largest value ($R_{1k}C$), a smallest value ($R_{1x}C$), a second smallest value ($R_{1y}C$) and a third smallest value ($R_{1z}C$) from the $R_{1n}C$ values, a coordinate ($X_x$) of the first driving-sensing electrode for detecting the $R_{1x}C$ at the high impedance direction, a coordinate ($X_y$) of the first driving-sensing electrode for detecting the $R_{1y}C$ at the high impedance direction, and a coordinate ($X_z$) of the first driving-sensing electrode for detecting the $R_{1z}C$ at the high impedance direction; and
   calculating the coordinate of the touch spot at the high impedance direction by using the $R_{1k}C$, the $R_{1x}C$, the $R_{1y}C$, the $R_{1z}C$, the $X_x$, the $X_y$, and the $X_z$ by interpolation.

3. The method as claimed in claim 2, wherein a formula for the interpolation method is $$\frac{X_x \Delta R_{1x}C + X_y \Delta R_{1y}C + X_Z \Delta R_{1Z}C}{\Delta R_{1x}C + \Delta R_{1y}C + \Delta R_{1Z}C},$$

wherein $\Delta R_{1x}C = R_{1k}C - R_{1x}C$, $\Delta R_{1y}C = R_{1k}C - R_{1y}C$, $\Delta R_{1z}C = R_{1k}C - R_{1z}C$.

4. The method as claimed in claim 2, when the $R_{1y}C$ is equal to the $R_{1z}C$, a formula for the interpolation is $$\frac{X_z \Delta R_{1z}C + X_y \Delta R_{1y}C}{\Delta R_{1z}C + \Delta R_{1y}C},$$

wherein $\Delta R_{1y}C = R_{1k}C - R_{1y}C$, $\Delta R_{1z}C = R_{1k}C - R_{1z}C$.

5. The method as claimed in claim 2, when the $R_{1x}C$ is equal to the $R_{1y}C$, a formula for the interpolation is $$\frac{X_x \Delta R_{1x}C + X_y \Delta R_{1y}C}{\Delta R_{1x}C + \Delta R_{1y}C},$$

wherein $\Delta R_{1x}C = R_{1k}C - R_{1x}C$, $\Delta R_{1y}C = R_{1k}C - R_{1y}C$.

6. The method as claimed in claim 1, wherein the step of calculating a coordinate of the touch spot at the low impedance direction further comprises using the resistance $R_{1n}$ as a variable in a function relation, the function relation defines a relation of a difference between the coordinate of the touch spot at the high impedance direction and the coordinate of each of the plurality of first driving-sensing electrodes at the high impedance direction, the coordinate of the touch spot at the low impedance direction, and the resistance $R_{1n}$.

7. The method as claimed in claim 1, wherein the pulse signals are inputted into the plurality of first driving-sensing electrodes one by one or simultaneously.

8. The method as claimed in claim 7, when the pulse signals are inputted into the plurality of first driving-sensing electrodes one by one, the first driving-sensing electrodes not receiving the pulse signals are grounded or connected to a fixed potential.

9. The method as claimed in claim 1, wherein the coupling capacitance is alternately charged and discharged, and a charged period is larger than a discharged period.

10. The method as claimed in claim 9, wherein the coupling capacitance is gradually charged or discharged from a transient state to a steady state.

11. The method as claimed in claim 1, wherein the driving circuit comprises a charging circuit adapted for charging the coupling capacitor and a first switch adapted for controlling the charging circuit.

12. The method as claimed in claim 11, wherein the sensing circuit comprises a storage circuit, a reading circuit and a second switch configured for controlling the storage circuit and the reading circuit.

13. The method as claimed in claim 12, wherein the storage circuit comprises a capacitor, when the coupling capacitance is discharged, the capacitor is charged.

14. The method as claimed in claim 12, wherein the first switch and the second switch is alternately turned on to form the pulse signals.

15. The method as claimed in claim 1, wherein the conductive film is at least one carbon nanotube film.

16. The method as claimed in claim 15, wherein the carbon nanotube film comprises a plurality of carbon nanotubes, the plurality of carbon nanotubes being arranged to substantially align in the low impedance direction.

17. The method as claimed in claim 16, wherein the conductive film comprises a plurality of carbon nanotube films overlapped with each other, and the aligned directions of the plurality of carbon nanotubes in the adjacent carbon nanotube films are the same.

18. The method as claimed in claim 1, wherein a distance between adjacent ones of the plurality of first driving-sensing electrodes is in a range from about 3 mm to about 5 mm.

19. A method for detecting touch spot of touch panel, the touch panel comprising:
   a substrate;
   a conductive film disposed on the substrate, wherein the conductive film is impedance isotropic and defines a low impedance direction and a high impedance direction substantially perpendicular to the low impedance direction, the conductive film comprises a first side and a second side opposite to the first side, a direction from the first side to the second side is the low impedance direction;
   a plurality of first driving-sensing electrodes arranged along the first side and spaced from each other;
   a plurality of second driving-sensing electrodes arranged along the second side and spaced from each other;
   wherein the plurality of first driving-sensing electrodes and the plurality of second driving-sensing electrodes are electrically connected with the conductive film, each of the plurality of first driving-sensing electrodes and the plurality of second driving-sensing electrodes is electrically connected with a driving circuit and a sensing circuit, when the touch panel is touched by a conductive object at a touch spot, a coupling capacitance having a capacitance value C between the conductive film and the conductive object is formed, a resistance of the conductive film between a touch spot and each of the plurality of first driving-sensing electrodes is represented by $R_{11}$, $R_{12}$, ... $R_{1n}$ (n=1, 2, 3, ... ), and a resistance of the conductive film between the touch spot and each of the plurality of second driving-sensing electrodes is represented by $R_{21}$, $R_{22}$, ... $R_{2n}$ (n=1, 2, 3, ... );

the method comprising:
   inputting a pulse signal into each of the plurality of first driving-sensing electrodes by the driving circuit, and reading a $R_{1n}C$ value detected by each of the sensing circuit, thereby simulating a first curve of $R_{1n}C$ values along the high impedance direction;
   inputting a pulse signal into each of the plurality of second driving-sensing electrodes by the driving circuit, and reading a $R_{2n}C$ value detected by each of the sensing circuit, thereby simulating a second curve of the $R_{2n}C$ values along the high impedance direction;
   comparing one of the $R_{1n}C$ with one of the $R_{2n}C$ wherein the $R_{1n}C$ and the $R_{2n}C$ representing a same coordinate in the first curve and the second curve at the high impedance direction, and using the second curve to detect the coordinate of the conductive film at the high impedance direction when the $R_{1n}C$ is greater than the $R_{2n}C$; and
   calculating a coordinate of the touch spot at the low impedance direction by computing a ratio of the $R_{2n}C$ detected by the plurality of second driving-sensing electrodes to the capacitance C to obtain the resistance $R_{1n}$ of the conductive film between the touch spot and the second driving-sensing electrodes.

* * * * *